United States Patent [19]
Foree

[11] Patent Number: 6,037,676

[45] Date of Patent: Mar. 14, 2000

[54] ELECTRICAL CURRENT MEASURING AND CIRCUIT BREAKING DEVICE

[76] Inventor: Richard V Foree, P.O. Box 126, Hanalei, Hi. 96714

[21] Appl. No.: 09/128,612

[22] Filed: Aug. 3, 1998

[51] Int. Cl.$^7$ ...................................................... H02H 7/18
[52] U.S. Cl. ............................ 307/10.7; 361/93; 340/455
[58] Field of Search ..................................... 307/9.1–10.7, 307/131, 125, 112, 116; 361/187, 93, 100, 101; 340/425.5, 455, 825.69, 825.72; 320/134, 136, DIG. 18

[56] References Cited

U.S. PATENT DOCUMENTS

| | | |
|---|---|---|
| 3,443,191 | 5/1969 | Medlar . |
| 3,445,746 | 5/1969 | Delatorre . |
| 4,902,956 | 2/1990 | Sloan . |
| 4,962,543 | 10/1990 | Kuge et al. ............................ 307/10.7 |
| 5,089,762 | 2/1992 | Sloan . |
| 5,140,250 | 8/1992 | Morland ................................ 307/10.7 |
| 5,170,151 | 12/1992 | Hochstein .............................. 340/455 |
| 5,332,958 | 7/1994 | Sloan .................................... 307/10.7 |
| 5,397,925 | 3/1995 | Carlo et al. ............................ 307/10.3 |
| 5,422,548 | 6/1995 | Yamashita . |
| 5,459,357 | 10/1995 | Minks . |
| 5,521,443 | 5/1996 | Imura et al. ............................ 307/10.7 |

*Primary Examiner*—Richard T. Elms
*Attorney, Agent, or Firm*—Michael I. Kroll

[57] ABSTRACT

A electrical current measuring and circuit breaking system attached between a vehicle battery and a vehicle power cable for measuring a current flowing from the battery. The electrical current measuring and circuit breaking system includes a clamp for connecting with a terminal of the battery and an electrical terminal for connection to the power cable. A device for sensing current flowing from the battery is connected to the clamp. The sensed current is transmitted to a comparator for comparing the sensed current to a reference value and determining when the sensed current is one of equal to and less than the reference value. The electrical current measuring and circuit breaking system may also include a device for alerting the operator when the battery power has reached a predetermined level. In this instance a signal will be transmitted to an alarm device available to the operator to alert the driver that the battery current is at a low level.

14 Claims, 4 Drawing Sheets

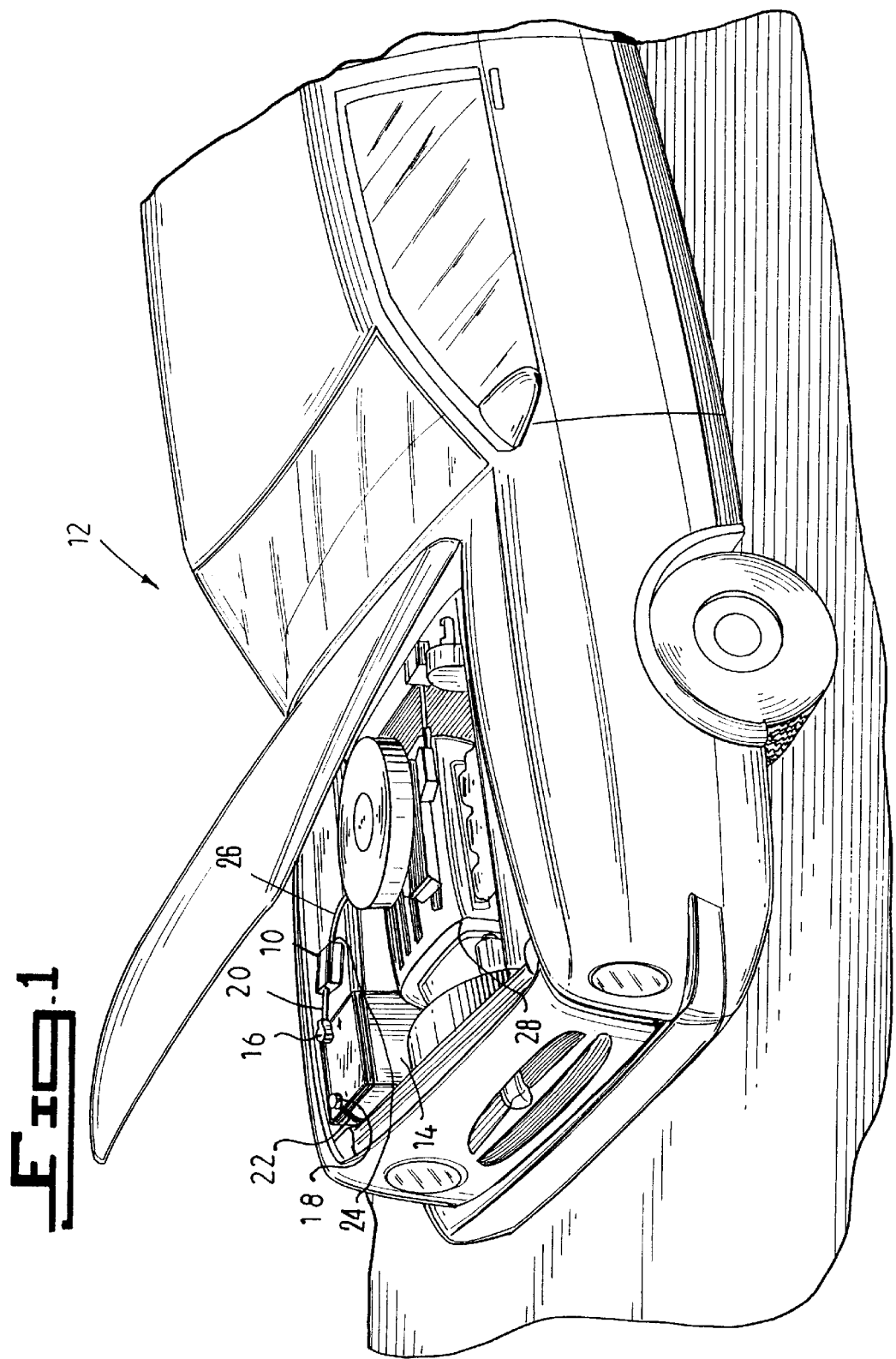

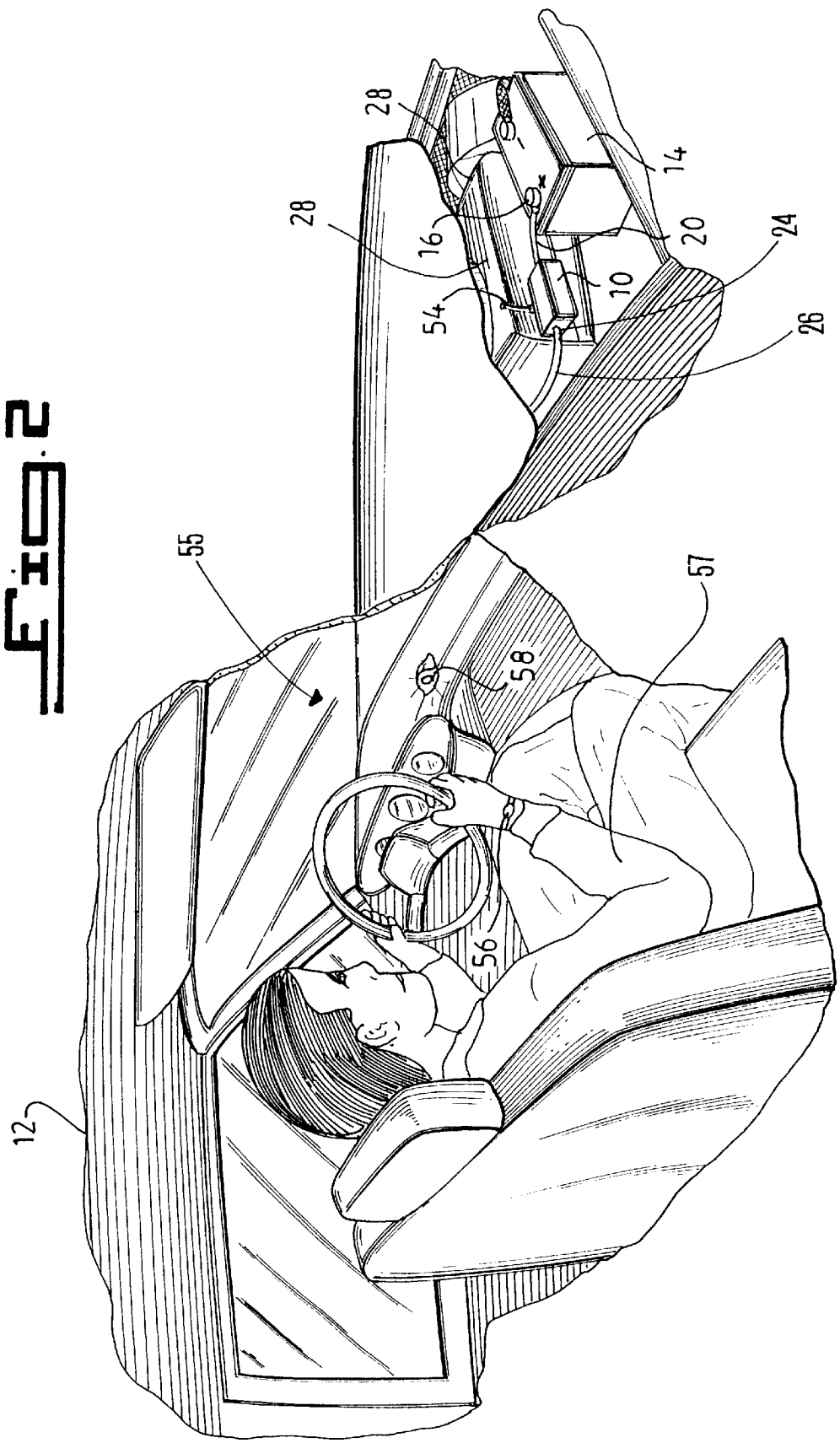

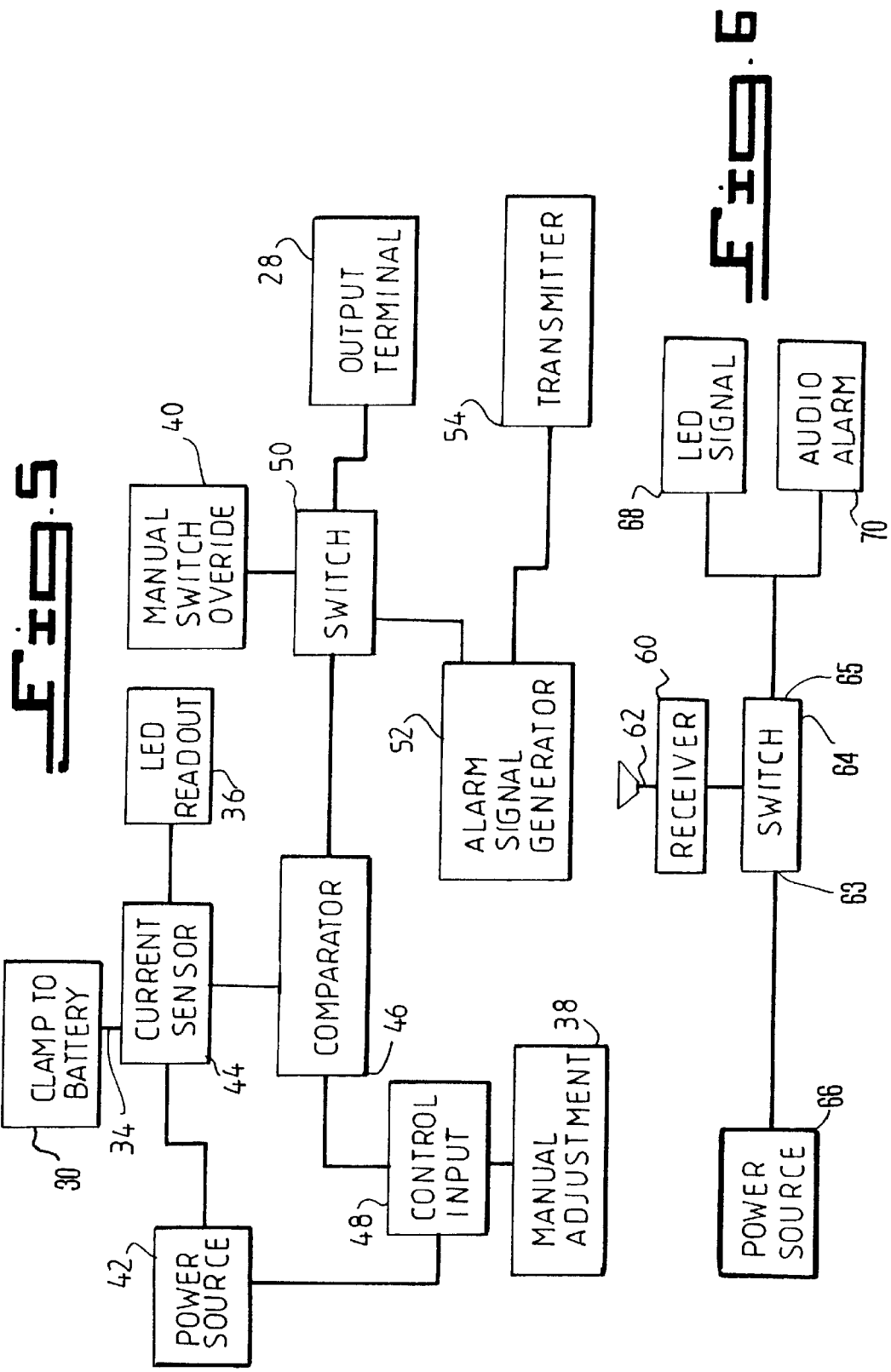

ELECTRICAL CURRENT MEASURING AND CIRCUIT BREAKING DEVICE

BACKGROUND OF THE INVENTION

1. Field of the Invention

The present invention relates generally to vehicle battery and electrical systems and, more specifically, to a device which will measure the current flowing from the battery and terminate the battery connection when the current reaches a predetermined level.

2. Description of the Prior Art

Numerous vehicle battery monitoring systems have been provided in the prior art. For example, U.S. Pat. Nos. 3,443,191; 3,445,746; 5,422,548 and 5,459,357 all are illustrative of such prior art. While these units may be suitable for the particular purpose to which they address, they would not be as suitable for the purposes of the present invention as heretofore described.

SUMMARY OF THE PRESENT INVENTION

The present invention relates generally to vehicle battery and electrical systems and, more specifically, to a device which will measure the current flowing from the battery and terminate the battery connection when the current reaches a predetermined level.

A primary object of the present invention is to provide an electrical current measuring and circuit breaking system that will overcome the shortcomings of prior art devices.

Another object of the present invention is to provide an electrical current measuring and circuit breaking system which is able to measure the current flowing from a vehicle battery.

An additional object of the present invention is to provide an electrical current measuring and circuit breaking system including a connection for coupling between the vehicle battery and the power cable.

A further object of the present invention is to provide an electrical current measuring and circuit breaking system able to compare the current flowing from a vehicle battery to a predetermined current value to determine if the current is low.

A yet further object of the present invention is to provide an electrical current measuring and circuit breaking system which is able to produce an alarm signal to alert the driver that the battery power is low.

A still further object of the present invention is to provide an electrical current measuring and circuit breaking system including a device for adjusting the predetermined current value.

Another object of the present invention is to provide an electrical current measuring and circuit breaking system that is simple and easy to use.

A still further object of the present invention is to provide an electrical current measuring and circuit breaking system that is economical in cost to manufacture.

Additional objects of the present invention will appear as the description proceeds.

An electrical current measuring and circuit breaking system and system attached between a vehicle battery and a vehicle power cable for measuring a current flowing from the battery and alerting the driver as to a low current flow level is disclosed by the present invention. The electrical current measuring and circuit breaking system and system includes a clamp for connecting with a terminal of the battery and an electrical terminal for connection to the power cable. A device for sensing current flowing from the battery is connected to the clamp. The sensed current is transmitted to a comparator for comparing the sensed current to a reference value and determining when the sensed current is either equal to or less than the reference value. When the sensed value is either equal to or less than the reference value a signal is transmitted to an alarm device to alert the driver when the vehicle is running that the battery current is at a low level.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIG. 1 is a top perspective view of the electrical current measuring and circuit breaking system of the present invention installed within a vehicle;

FIG. 2 is a top perspective view with parts cut away of the electrical current measuring and circuit breaking system of the present invention installed within a vehicle and showing a driver within the vehicle and alarms alerting the driver as to a sensed emergency situation;

Figure 4:
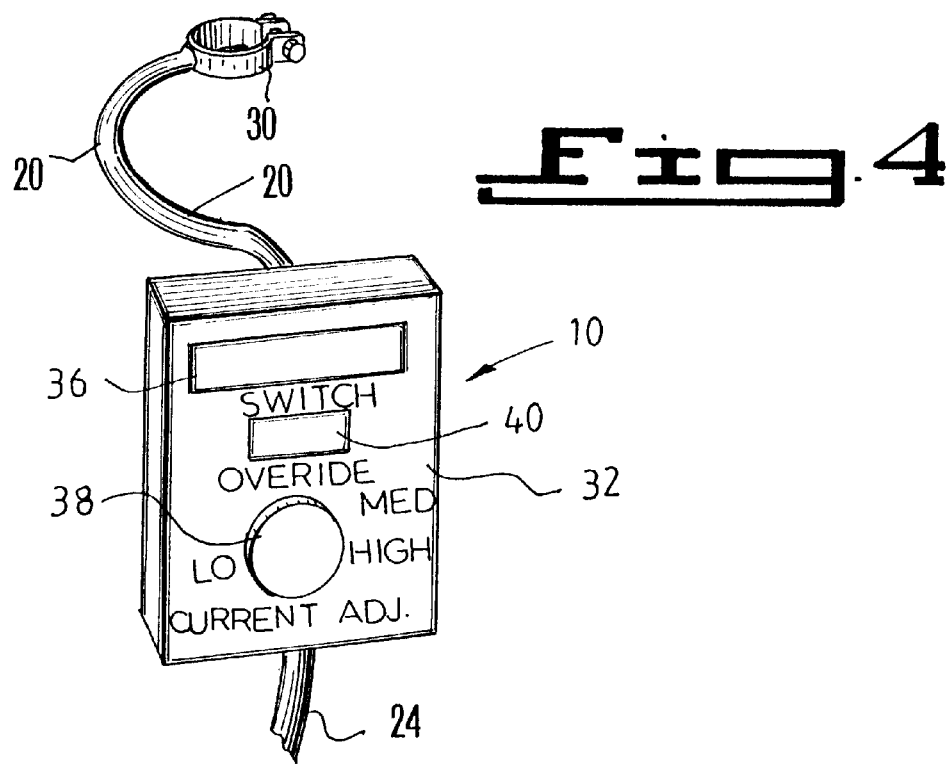

FIG. 4 a top perspective view of the electrical current measuring and circuit breaking system of the present invention;

FIG. 5 is a schematic block diagram of the electrical current measuring and circuit breaking system of the present invention; and FIG. 6 is a schematic block diagram of the remote warning signaler for use with the electrical current measuring and circuit breaking system of the present invention.

DETAILED DESCRIPTION OF THE PREFERRED EMBODIMENT

Turning now descriptively to the drawings, in which similar reference characters denote similar elements throughout the several views, FIGS. 1 through 6 illustrate the electrical current measuring and circuit breaking system of the present invention indicated generally by the numeral 10.

The electrical current measuring and circuit breaking system 10 is installed within a vehicle 12 such as an automobile as illustrated in FIGS. 1 and 2. The installation of the electrical current measuring and circuit breaking system 10 in an automobile is for purposes of example only as the electrical current measuring and circuit breaking system 10 can be installed in and utilized by any vehicle such as a truck, van, bus, motorcycle, etc. and modified to fit the vehicle in which it is installed.

FIG. 1 illustrates the electrical current measuring and circuit breaking system 10 installed within a car 12. The hood of the car 12 is illustrated in an open position to show the connection of the electrical current measuring and circuit breaking system 10 within the car 12. Located beneath the hood of the car 12 is a battery 14 including a positive terminal 16 and a negative terminal 18. The electrical current measuring and circuit breaking system 10 includes a clamp 20 for connection to the positive terminal 16 of the battery 14. Connected to the negative terminal 18 of the battery 14 is the conventional power connection wire 22 provided with the car 12. On a side of the electrical current measuring and circuit breaking system 10 opposite the clamp 20 for connection to the positive terminal 16 of the battery 14 is a terminal 24 for connection with a power cable 26. The power cable 26 is present in conventional vehicles for connection to the positive terminal 16 of the vehicle battery 14. The cables 22 and 26 are then connected to the vehicle engine 28 and all other electrical systems as in conventional vehicles. The electrical current measuring and circuit breaking system 10 is simply connected between the positive terminal 16 and its associated power cable 26.

FIG. 2 illustrates the electrical current measuring and circuit breaking system 10 connected within a vehicle 12 including the passenger compartment 55 of the vehicle 12. The driver or user 57 of the vehicle 12 will be equipped with a remote control paging unit 56 for providing a visual indication of an alarm situation sensed by the electrical current measuring and circuit breaking system 10. As is illustrated in this figure, a visual indicator 58 is installed within the vehicle 12 to alert the driver 57 as to the sensing of an emergency situation by the electrical current measuring and circuit breaking system 10. The visual indicator 58 is preferably installed within the dashboard of the vehicle 12 in a prominent and easily visible location. The electrical current measuring and circuit breaking system 10 includes a transmitter antenna 54 for transmitting a signal to the remote control paging unit 56 and the visual indicator 58 when a low current or emergency situation is detected.

Figure 3:
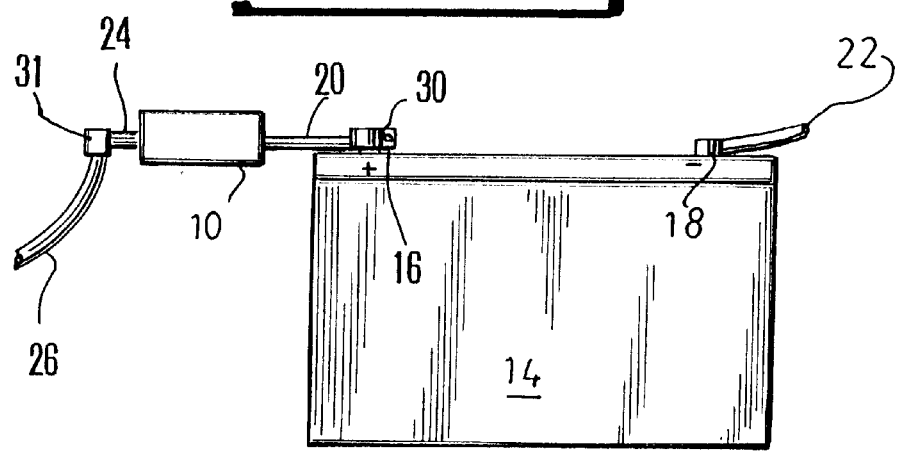
FIG. 3 is a side view of the electrical current measuring and circuit breaking system of the present invention connected between a positive terminal of a vehicle battery and a power cable.

A side view of the electrical current measuring and circuit breaking system 10 connected between the positive terminal 16 of the battery 14 and the power cable 26 is illustrated in FIG. 3. As can be seen from this view, the electrical current measuring and circuit breaking system 10 includes a terminal 20 extending therefrom and a clamp 30 on an end of the terminal 20 for connection to the positive terminal 16 of the battery 14. Extending from the opposite end of the electrical current measuring and circuit breaking system 10 is a second terminal 24 for connection to a terminal 31 of the power cable 26.

A front face view of the electrical current measuring and circuit breaking system 10 is illustrated in FIG. 4. This figure illustrates the terminal 20 and clamp 30 for connection to the positive terminal 16 of the battery 14 extending from the first end of the electrical current measuring and circuit breaking system 10. The second terminal 24 for connection to a terminal 31 of the power cable 26 extends from the opposite end thereof. The electrical current measuring and circuit breaking system 10 is includes a housing 32 having an LED display 36 on the face side thereof. The LED display 36 displays a value indicative of the current flowing from the battery 14 to the power cable 26 and sensed by the electrical current measuring and circuit breaking system 10. Also on the face side and extending from the housing 32 is an on/off override switch 40 for controlling the connection of the battery 14 to the power cable 26 through the electrical current measuring and circuit breaking system 10. A current adjustment dial 38 also extends from the face side of the housing 32. The current adjustment dial 38 includes a plurality of settings, illustrated in the figure as low, medium and high. This dial 38 is used to adjust the reference current value for comparison to the sensed current as will be explained hereinafter. Furthermore, the adjustment dial 38 is not limited to the settings depicted but may include additional settings to more accurately adjust the reference current.

A schematic block diagram of the electrical current measuring and circuit breaking system 10 installed within the vehicle 12 is shown in FIG. 5. As is clearly shown in this figure the electrical current measuring and circuit breaking system 10 includes a power source 42. The power source 42 may be an individual power source such as a battery connected thereto or alternatively may be the vehicle battery 14. The power source 42 is connected to a current sensor 44 which is connected to the battery clamp 30 via a wired connection 34. The current sensor 44 is connected to the LED display 36 for displaying the sensed current value. A control input 48 is connected to the manual adjustment dial 38 and also connected to the power source 42. The control input 48 is also connected to a comparator 46. The control input 48 is controlled by the manual adjustment dial 38 to supply a reference/control voltage to the comparator 46. The comparator is also connected to the current sensor 44 to receive a voltage indicative of the sensed current for comparison with the reference voltage received from the control input 48. The comparator 46 is also connected for controlling the state of a switch 50 based upon the comparison of the reference voltage and the sensed voltage value.

The switch 50 is a double switch including first and second switches. The first switch is connected between the comparator 46 and an alarm signal generator 52. When the first switch is controlled by the comparator 46 to be closed the alarm signal generator 52 is activated to generate an alarm signal. A transmitter 54 may be connected to the alarm signal generator 52. In this configuration, the transmitter 54 will transmit the generated alarm signal to the remote control paging unit 56 and visual indicator 58 alerting the driver that the battery current is low.

The second switch 50 is controlled by the comparator 46 to connect the output terminal 28 to the battery clamp 30 providing a path for current to flow through the electrical current measuring and circuit breaking system 10. When the second switch 50 is open current is prevented from flowing therethrough. However, the second switch 50 will not prevent the flow of current therethrough while the vehicle is running or is in the process of being started. The second switch 50 will only open to prevent current from flowing therethrough when the engine is not running. A manual override switch 40 is also connected to the switch 50 for overriding the state of the second switch and providing a path for current to flow through the electrical current measuring and circuit breaking system 10 allowing the electrical system of the vehicle to be operative until all of the vehicle's stored battery power has been depleted, if need be.

FIG. 6 illustrates a schematic block diagram of the remote control paging unit 56 or visual indicator 58 of the electrical current measuring and circuit breaking system 10. The remote control paging unit 56 and visual indicator 58 each include a receiver 60 and receiver antenna 62 combination. The receiver 60 and receiver antenna 62 combination is tuned to receive signals transmitted by the transmitter 54 of the electrical current measuring and circuit breaking system 10 installed within the vehicle 12. The visual indicator 58 may alternatively be hardwired to the electrical current measuring and circuit breaking system 10, receiving signals from the comparator 46 directly and thus eliminate the necessity for the receiver 60 and receiver antenna 62 combination. The receiver 60 and antenna combination is connected to activate a switch 64. The switch 64 is connected at a first terminal 63 to a power source 66. The switch is connected at a second terminal 65 to both or one of a visual alarm 68 and an audible alarm 70. The visual alarm 68 may be in the form of a light emitting diode (LED) positioned on the dashboard of the vehicle 12 as illustrated in FIG. 2. When a signal is received by the receiver 60 and receiver antenna 62 combination the switch 64 is forced to close, connecting the power source 66 to and thereby activating the visual indicator alarm 68 and the audible alarm 70. A subsequent signal may be transmitted to open the switch 64 and disconnect the power source 66 from the visual indicator alarm 68 and the audible alarm 70.

While a preferred mechanism for alerting the operator to low current level of the vehicle battery is shown and described herein, those of ordinary skill in the art who have read this description will appreciate that there are numerous other mechanisms for alerting the operator to low current level of the vehicle battery and, therefore, as used herein the phrase "means for alerting" should be construed as including all such mechanisms as long as they achieve the desired result of alerting the operator to low current level of the vehicle battery, and, therefore, that all such alternative mechanisms are to be considered as equivalent to the one described herein.

The operation of the device will now be described with reference to the figures. In operation, the electrical current measuring and circuit breaking system 10 designed in accordance with the present invention is installed in the vehicle 12. The clamp 30 is connected to the positive terminal of the battery 14 and the power cable 26 is connected to the terminal 24 of the electrical current measuring and circuit breaking system 10. The manual adjustment switch 38 is then adjusted to provide a desired reference voltage for comparison with a sensed voltage value for the battery 14.

Once the electrical current measuring and circuit breaking system 10 is installed in the vehicle and the engine is not running, the electrical current measuring and circuit breaking system 10 monitors the power level of the battery, detecting any drain of power from the battery, such as when the headlights are left on after the vehicle has been turned off. Once the power level of the battery is detected to fall to a predetermined level, the electrical current measuring and circuit breaking system 10 will break the connection to the battery preventing any further drain on the battery. This ensures that the battery will always have enough power to start the vehicle. Should an alarm system be connected to the electrical current measuring and circuit breaking system 10, an alarm signal will be transmitter to the operator or be indicated on a dashboard display upon detecting the battery power falling to the predetermined level.

If the engine is still not running but the key has been inserted and is controlling the application of power to certain electrical systems such as the windshield wipers, radio or heating unit, the electrical current measuring and circuit breaking system 10 will monitor the battery power as described above. Upon detecting the falling of the battery power to the predetermined level the electrical current measuring and circuit breaking system 10 will transmit a warning signal to alert the operator as to the falling power level a predetermined time before breaking the circuit with the battery and causing the electrical systems which are operating to turn off.

When the engine is turned on, the current sensor 44 constantly monitors the current flowing from the battery 14 and supplies a voltage representative of the monitored current to the comparator 46. The comparator 46 constantly compares the voltage representative of the monitored current to the reference value supplied by the control input 48. The control input 48 is connected to the power source 42 for delivering a reference voltage to the comparator 46, the reference voltage being controlled by the manual adjustment dial 38. If the voltage representative of the monitored current is determined by the comparator 46 to be larger than the reference voltage the vehicle will operate normally. When the voltage representative of the monitored current is determined to be within a certain range above the reference voltage the first switch may be closed and an alarm signal generated to alert the driver that the battery voltage is nearing a critical level.

The transmitted signal will be received by the visual indicator alarm 68 and the audible alarm 70 acting to close the switch 64. This will connect the visual and audible alarms 68 and 70, respectively, to the internal power source for generating a visual and audible alarm. However, the electrical current measuring and circuit breaking device 10 will not interfere with the operation of the engine once it is running or being started. The manual override switch 40 may be used to close the second switch allowing the driver to use the electrical systems of the vehicle 12. The reference voltage will normally be set at a level which is slightly above the voltage level needed for starting the vehicle 12 so that the driver will be alerted that the vehicle 12 may have difficulty starting and use of numerous electrical options on the vehicle 12 may further drain the battery 14. It is also used to alert the driver to run the vehicle so that the battery 14 may be recharged to an adequate level for proper use.

From the above description it can be seen that the electrical current measuring and circuit breaking system of the present invention is able to overcome the shortcomings of prior art devices by providing an electrical current measuring and circuit breaking system which is able to measure the current flowing from a vehicle battery and produce an alarm signal to alert the driver that the battery power is low. The electrical current measuring and circuit breaking system includes a connection for coupling between the vehicle battery and the power cable in order to compare the current flowing from a vehicle battery to a predetermined current value to determine if the current is low. The electrical current measuring and circuit breaking system includes a manual adjustment device for adjusting the predetermined current value. Furthermore, the electrical current measuring and circuit breaking system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A electrical current measuring and circuit breaking system attached between a vehicle battery and a vehicle power cable for measuring a current flowing from the battery, said electrical current measuring and circuit breaking system comprising:
   a) clamp means for connecting with a terminal of the battery;
   b) an electrical terminal for connection to the power cable;
   c) means for sensing current flowing from the battery connected to said clamp means; and
   d) means connected to said current sensing means for comparing said sensed current to a reference value and determining when said sensed current is one of equal to and less than said reference value, and further comprising:
   e) means for generating said reference voltage connected to said means for comparing, said means for generating said reference voltage including a manual adjustment device for manually adjusting the reference voltage.

2. The electrical current measuring and circuit breaking system as recited in claim 1, further comprising means for alerting the driver upon determining said sensed value is one of equal to and less than said reference value.

3. The electrical current measuring and circuit breaking system as recited in claim 2, wherein said means for alerting the driver is a remote alarm device; and said system further comprises a transmitter means connected to said comparing means for generating an alarm signal indicating an alarm situation exists upon a determination by said comparing means that said sensed current is one of equal to and less than said reference value and transmitting said alarm signal to said remote alarm device for alerting the driver as to an emergency situation.

4. The electrical current measuring and circuit breaking system as recited in claim 3, wherein said remote alarm device is a mobile device held by the driver.

5. The electrical current measuring and circuit breaking system as recited in claim 4, wherein said remote alarm device includes a visual display for visually alerting the driver upon receipt of said alarm signal.

6. The electrical current measuring and circuit breaking system as recited in claim 5, wherein said remote alarm device includes an audible alarm for audibly alerting the driver upon receipt of said alarm signal.

7. The electrical current measuring and circuit breaking system as recited in claim 3, wherein said remote alarm device is positioned within a dashboard of the vehicle.

8. The electrical current measuring and circuit breaking system as recited in claim 7, wherein said remote alarm device includes a visual display for visually alerting the driver upon receipt of said alarm signal.

9. The electrical current measuring and circuit breaking system as recited in claim 8, wherein said remote alarm device includes an audible alarm for audibly alerting the driver upon receipt of said alarm signal.

10. The electrical current measuring and circuit breaking system as recited in claim 9, wherein said remote alarm device is hardwired to said comparison means.

11. The electrical current measuring and circuit breaking system as recited in claim 1, further comprising a display device connected to said means for sensing current for displaying said sensed current value.

12. The electrical current measuring and circuit breaking system as recited in claim 1, further including a switch connected between said clamp means and said electrical terminal for selectively providing a path for current to flow through said system.

13. The electrical current measuring and circuit breaking system as recited in claim 12, wherein said switch is controlled by said means for comparing to operate between an open position disconnecting said clamp means from said electrical terminal and a closed position connecting said clamp means to said electrical terminal.

14. The electrical current measuring and circuit breaking system as recited in claim 1, further comprising a manual override switch for manually controlling the position of said switch.

* * * * *